US008078953B2

(12) United States Patent
Kunz et al.

(10) Patent No.: US 8,078,953 B2
(45) Date of Patent: Dec. 13, 2011

(54) MATH CALCULATION IN WORD PROCESSORS

(75) Inventors: William B Kunz, Seattle, WA (US); Xin Li, Redmond, WA (US); Luke Kelly, Bellevue, WA (US); Jinsong Yu, Sammamish, WA (US); Seth R Atkinson, Seattle, WA (US); Murray Sargent, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 1169 days.

(21) Appl. No.: 11/776,566

(22) Filed: Jul. 12, 2007

(65) Prior Publication Data

US 2009/0019099 A1 Jan. 15, 2009

(51) Int. Cl.
*G06F 17/00* (2006.01)
(52) U.S. Cl. ......... 715/209; 715/200; 715/267; 715/864
(58) Field of Classification Search .................. 715/209; 708/200; 382/229; 395/140
See application file for complete search history.

(56) References Cited

U.S. PATENT DOCUMENTS

| 5,189,633 A * | 2/1993 | Bonadio ................. 708/142 |
| 5,251,292 A | 10/1993 | Martel, Jr. et al. |
| 5,504,848 A | 4/1996 | Yamada et al. |
| 5,526,475 A * | 6/1996 | Razdow ................. 715/205 |
| 6,502,114 B1 | 12/2002 | Forcier |
| 6,610,106 B1 | 8/2003 | Jenks |
| 2004/0114258 A1 | 6/2004 | Harris, III et al. |
| 2004/0210842 A1 | 10/2004 | Qamar |
| 2006/0062470 A1 * | 3/2006 | Zhu et al. ................. 382/186 |

OTHER PUBLICATIONS

Adrian Oldknow "ICT in Teaching and Learning Mathematics" Published Apr. 2004 pp. 1-13.*
"Math Type 5—Equation Editor", retrieved on Jun. 6, 2007 at <<http://www.wkbradford.com/mathtype.html>>, William K. Bradford, pp. 1-2.
Smith, et al., "MathScribe: A User Interface for Computer Algebra Systems", ACM,1986, pp. 7-12.

* cited by examiner

*Primary Examiner* — Quoc A Tran (57) ABSTRACT

Architecture for a word processing application that facilitates operating on mathematical symbols, expressions, and/or equations input to a word processing document, and returning results back to the document. User input to the document in the form of math symbols, expressions or equations is transformed into a format for processing by a math engine. The engine returns one or more operations to the user that can be performed on the input, including calculating mathematical solutions, graphing equations and viewing steps to solving math problems. A user interface allows the user choose from the possible operations and to interactively manipulate input and graphs in the word application. The results can be inserted directly into the document and also be graded automatically.

19 Claims, 10 Drawing Sheets

MATH CALCULATION IN WORD PROCESSORS

BACKGROUND

The advances in computing hardware and software are typically complimentary. In other words, advances in hardware provide a platform for richer and more complex software, and the advances in software can impact further improvements in the hardware. The rapid evolution of such hardware and software provides tools for research, business systems, and learning.

A common problem, however, is that new programs require users to learn new interfaces, menus, etc., thereby imposing impediments to learning these new programs. A significant portion of these impediments can be removed by employing software with which the user already has some measure of familiarity. Applications such as word processors have typically been used for composing documents. Thus, most users will have some level of comfort in using word processors, web browsers, and with less familiarity with spreadsheets, etc., the basic set of programs normally used in day-to-day computing activities.

In the academic environment, for example, students and teachers are now required to use computers to some extent for assignments, examinations, presentations, etc., and more specifically, word processing software for projects such as papers and lab work. When faced with using or preparing technical documents most which require some form of mathematics, this becomes even more problematic when required to also learn existing math software systems as this presents a fairly steep learning curve.

SUMMARY

The following is a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes an add-on to a word processing application that facilitates operating on mathematical symbols, expressions, and/or equations input to a word processing document, and returning results back to the document. When a user provides input in the form of math symbols, expressions or equations into the document using an editing tool, the input is transformed into a format that can be processed by a math engine. The engine processes the transformed input and returns one or more operations to the user that can be performed on the input. This can include calculating mathematical solutions, graphing equations and viewing steps to solving math problems. A user interface allows the user to choose from the possible operations and to interactively manipulate input and graphs in the word application.

The architecture also includes a grading component for automatically grading math documents in the word processor. Generated results according to the user input can be evaluated against the correct results, and a score input and presented in the document.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The disclosed architecture facilitates the input of math symbols, expressions and equations into a word document for results processing, and return of the results for presentation in the document. A math engine presents one or more operations to the user that can be performed on the input. The architecture can be implemented as an add-on to a word processing application.

The architecture finds particular application to the academic environment where teachers can issue examinations, assignments, and projects in a user-friendly application environment such as a word processor document. Students can annotate math problems in a text environment and perform graphing and graph manipulation. Teachers can create lesson plans, classroom materials, and exams via the word processor with the help of the math engine. The architecture can also obviate the need for a handheld calculator for many types of computer algebra applications.

In order to be educationally valuable, computer algebra systems (including computer algebra software, graphing calculator software, and handheld graphing calculators) need to help students learn to find the solutions to math problems.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Figure 1:
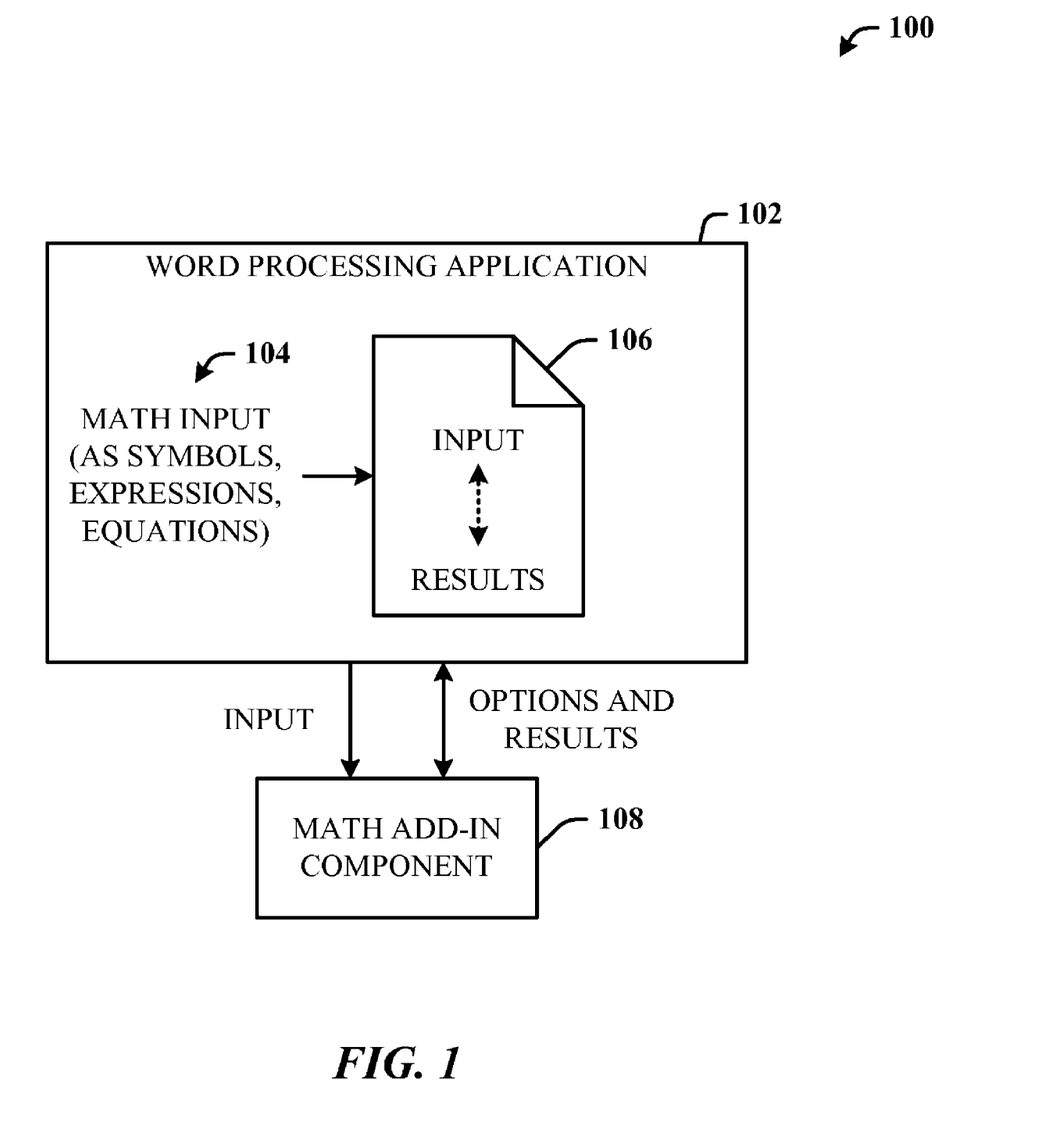
FIG. 1 illustrates a computer-implemented word processing system for math processing.

Referring initially to the drawings, FIG. 1 illustrates a computer-implemented word processing system 100. The system 100 includes a word processing application 102 for receiving and rendering math-based input 104 (INPUT) in a word processing document 106. A math component 108 (e.g., an add-in) that interfaces to the word processing application 102 receives and performs a math operation on the input 104 in the document 106 and returns a result (RESULT) to the document 106. In other words, the user can input the math-based input in the form of math symbols, expressions and/or equations into the document 106. The math component 108 processes and receives the input of the document 106, and processes the input to return options and/or results based on those options to the document 106.

Figure 2:
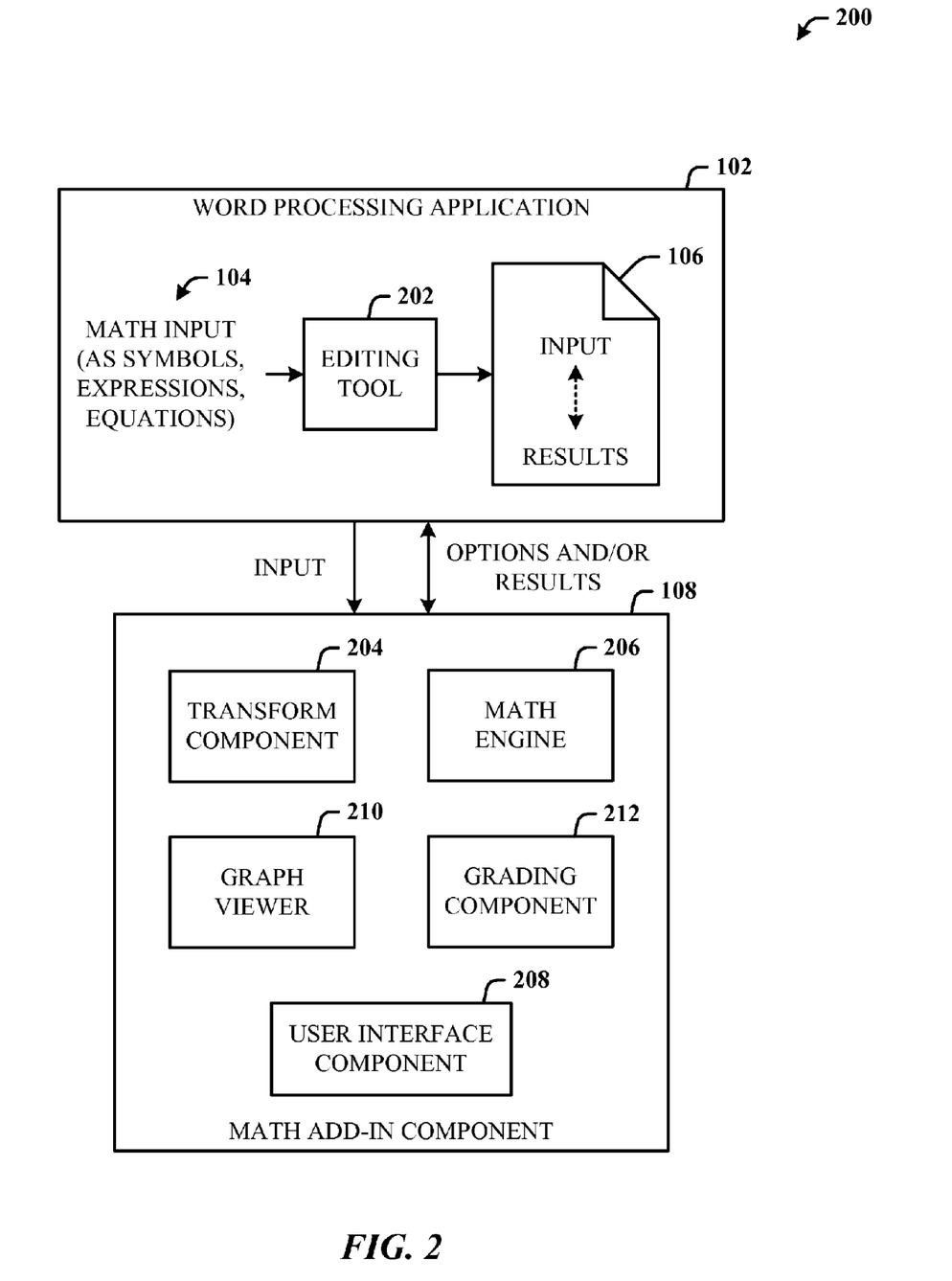
FIG. 2 illustrates an exemplary word processing system for handling computer algebra operations.

FIG. 2 illustrates an exemplary word processing system 200. Here, the word processing application 102 includes an editing tool 202 for entering the math-based input 104 into the document 106. The user enters the math input 104 into the document 106 of the word processing application 102 using the editing tool 202. The math component 108 includes a transform tool 204 that receives and converts the math input 104 (e.g., a math expression) into a suitable format (e.g., MathML) for processing by a math engine 206.

The math engine 206 analyzes the input and returns a number of options in the form of math operations that can be performed on the input, such as equation solving, graphing, calculating, integrating, generating and presenting the calculation steps, etc., by way of calls to the math engine 206. The options, for example, can be presented to the user for selection via a user interface component 208 that works with the user interface of the application 102. The selected operation is then passed to the math engine 206 to perform the operation. The engine 206 then passes the result (e.g., an interim result, final result) back to the math component 108 in a format suitable for the editing tool 202. If the selection is related to a graphing operation, a graph viewer 210 can be enabled to present a graphical view of the math input 104 to the user via the application 102. Alternatively, or in combination therewith, the results can be inserted into the document 106 for suitable placement (e.g., below the input). In one embodiment, the results are returned in a format compatible with the editing tool 202 such that the tool 202 inserts the results into the document 106. In an alternative embodiment, the format for the math component 108 is suitable for direct insertion of the results into the documents 106.

For the graphing operation, the math component 108 generates a dialog pop-up panel showing the graph and allowing the user to make customizations to the graph, such as moving, zooming, rotating (e.g., for a 3D graph), specifying colors, etc., before the graph is inserted into the document 106. The user can still modify the graphing object via the graph viewer 210 to make further customizations of the graph. When completed, the graph can be reinserted into the document 106.

The math component 108 can also include a grading component 212 for receiving the results information and comparing the results information against known answer information. The answer information can be provided via a table, for example, such that once the results have been computed, the grading component 212 accesses the table based upon indexed question data and generates a score. The score can be per question and/or set of questions, as desired. Other solutions are configurable such as curving the scores based on difficulty and so on.

In one implementation, the math-based input can be created and stored for auto-insertion into the document 106 during a student testing phase, for example. The student will then work through the problem using the user interface and word processing UI to arrive at an answer. Once completed, the correct answer and steps to arriving at the answer can be presented.

Figure 3:
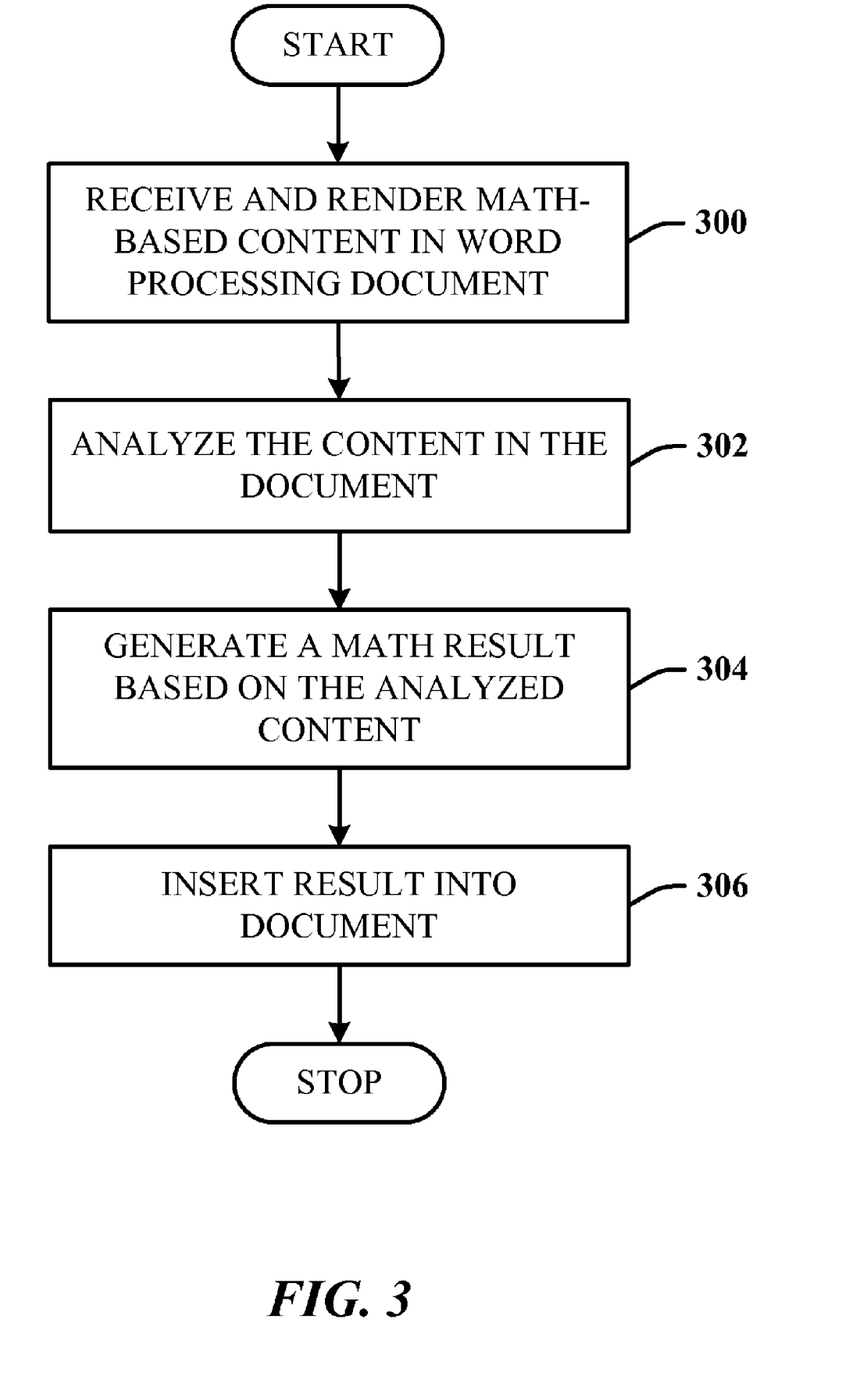
FIG. 3 illustrates a method of handling math information in a word processor.

FIG. 3 illustrates a method of handling math information in a word processor. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of inter-related states or events, such as in a state diagram. Moreover, not all acts illustrated in a methodology may be required for a novel implementation.

At 300, math-based content is received and rendered in a word processing document. At 302, the content in the document is analyzed. At 304, a math result is generated based on the analyzed content. At 306, the result is inserted into the document.

Figure 4:
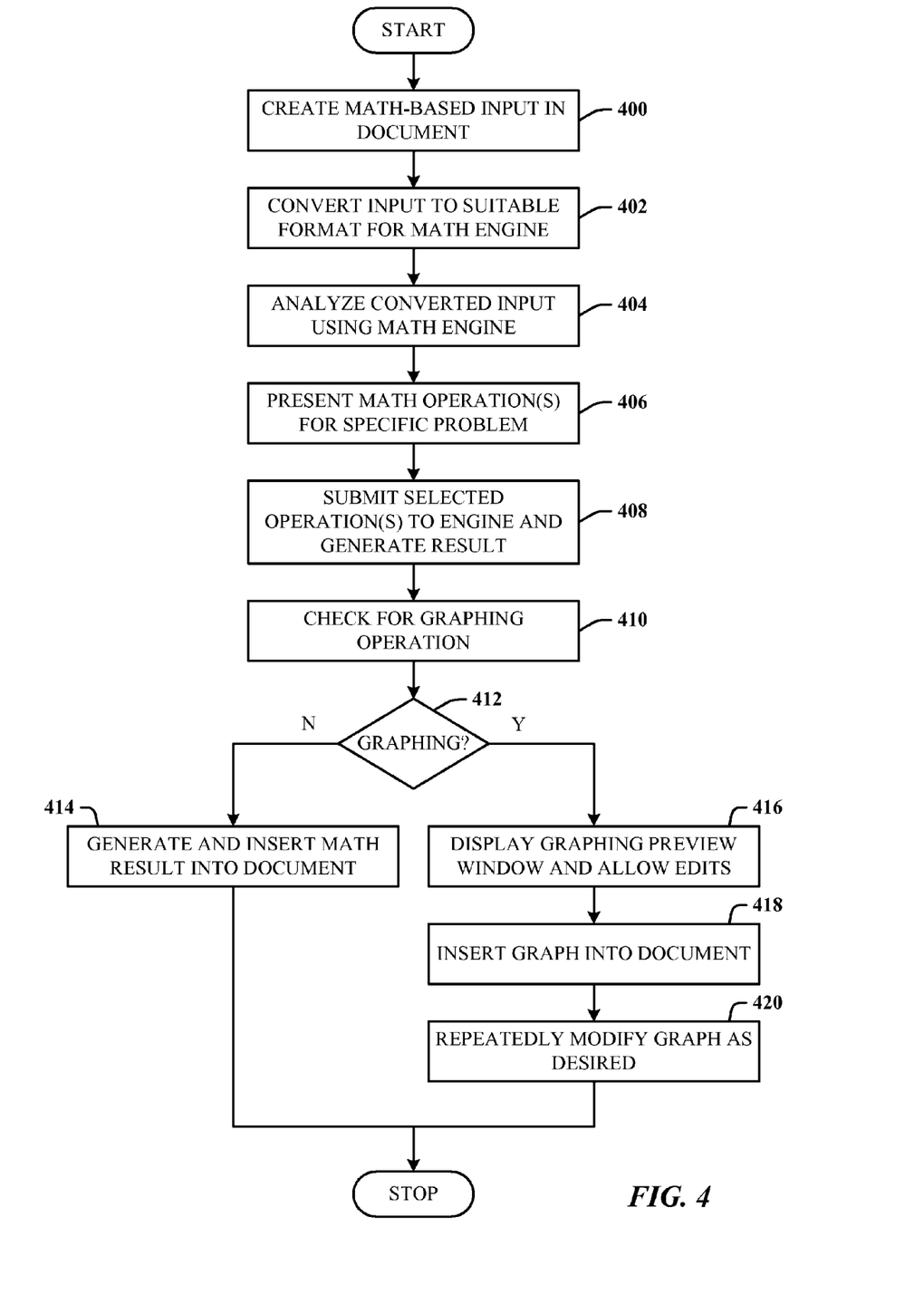
FIG. 4 illustrates an alternative method of processing a math expression in a word processing document.

FIG. 4 illustrates an alternative method of processing a math expression in a word processing document. At 400, a math-based input (e.g., an expression) is created in a document using an editing tool. At 402, the input is converted into a format for processing by a math engine. At 404, the engine analyzes the converted input. At 406, the engine returns a set of operations that can be performed on the input including, but not limited to, equation solving, graphing, calculating, integrating, presenting one or more calculation steps, etc. At 408, an operation is selected, submitted to the engine, and a result generated. At 410, the engine checks if the selected operation is a graphing operation. At 412, if not, flow is to 414 to generate and insert the result generated by the engine directly into the document. Alternatively, if the operation is a graphing operation, flow is from 412 to 416 to generate a graphing preview window (e.g., a dialog UI) showing the graph and allowing the user to make edits (or customizations) to the graph, such as moving, zooming, rotating (for 3D graph), specifying colors, etc., before the graph is inserted into the document, as indicated at 418. The user can still modify the graphing object via graph preview UI to make further customizations of the graph. When completed, the graph will be reinserted into the document, as indicated at 420.

Figure 5:
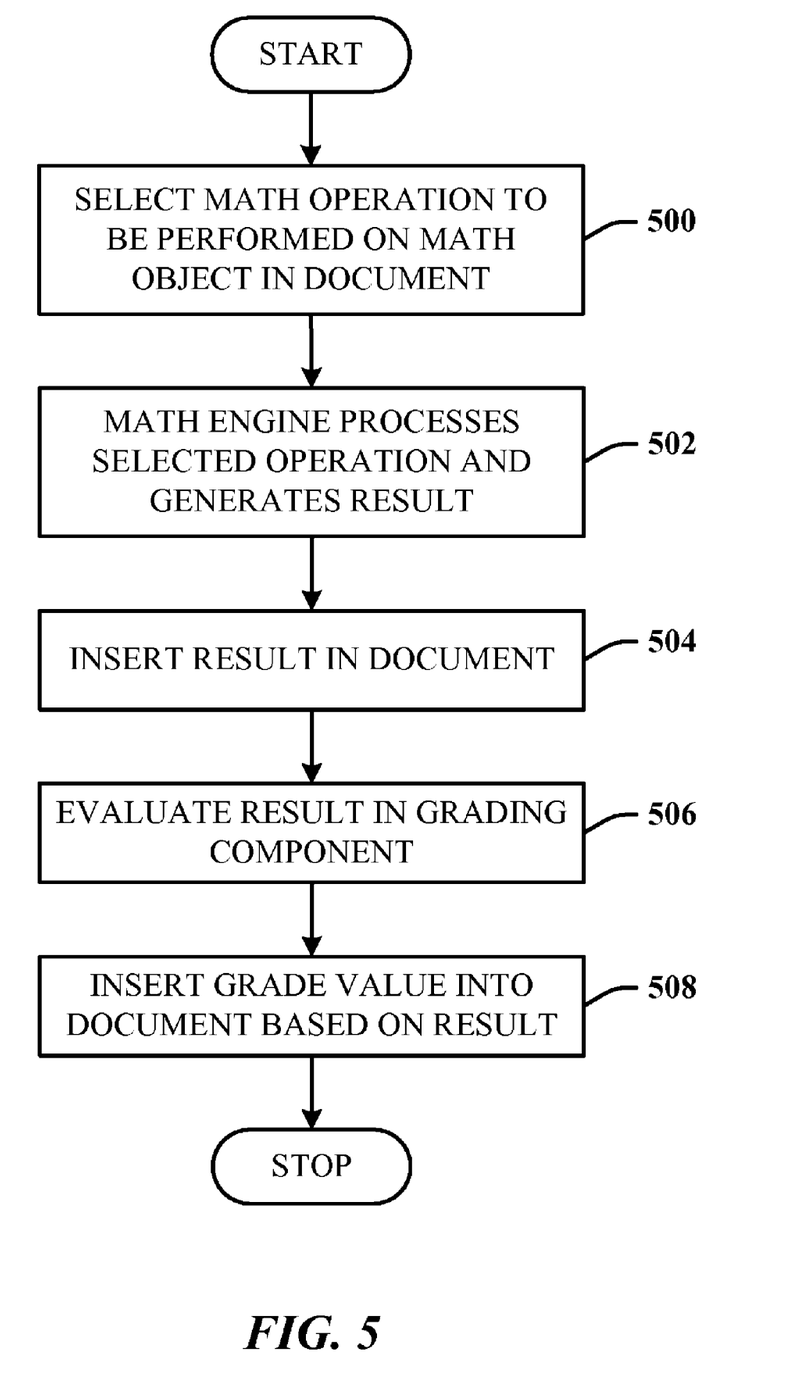
FIG. 5 illustrates a method of applying grading to a math-based result in a word processing document.

FIG. 5 illustrates a method of applying grading to a math-based result in a word processing document. At 500, a user selects a math operation to be performed on a math object input to the document. At 502, the math engine processes the operation and returns a result to the document. At 504, the result is received by a grading component for evaluation against a set of grading data (e.g., a table). At 506, based on the evaluation, a grade value is inserted into the document for presentation.

Figure 6:
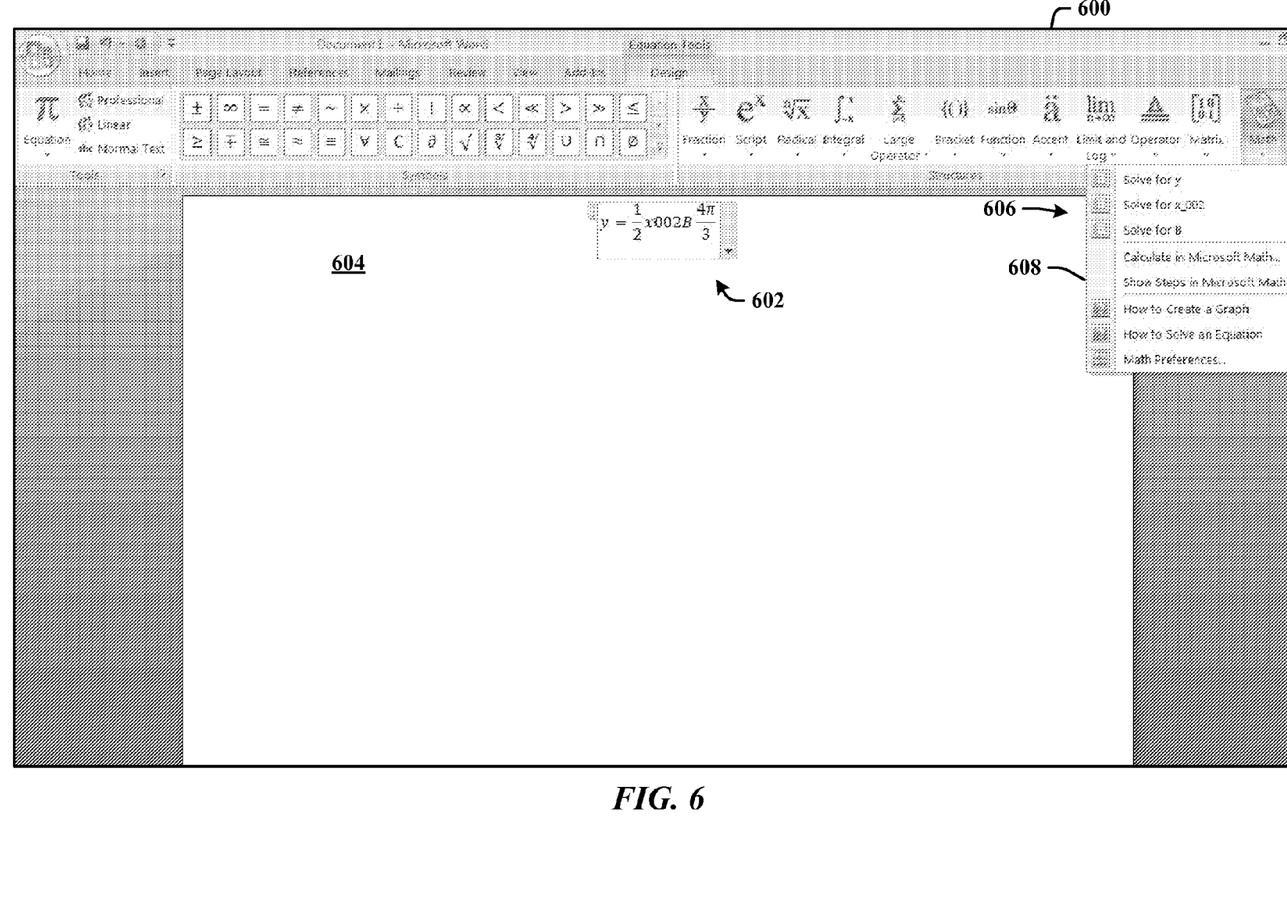
FIG. 6 illustrates a screenshot of an exemplary UI in a word processor for processing math-based input in a document.

FIG. 6 illustrates a screenshot of an exemplary UI 600 in a word processor for processing math-based input 602 in a document 604. Once entered, the input 602 is parsed, serialized and transformed into a format suitable for a math engine. The engine provides a list 606 of math operations that can be performed, the list 606 presented in a menu 608. The menu 608 shows other options that can be selected, such as solving for parts of the input 602, calculating the overall result and showing steps to arriving at the result, for example.

The UI 600 also provides options for entering math structures (e.g., fractions, scripts, radicals, integrals, brackets, functions, accents, limits, operators and matrices, etc.) and math symbols (e.g., add, subtract, divide, inequalities, etc.).

Figure 7:
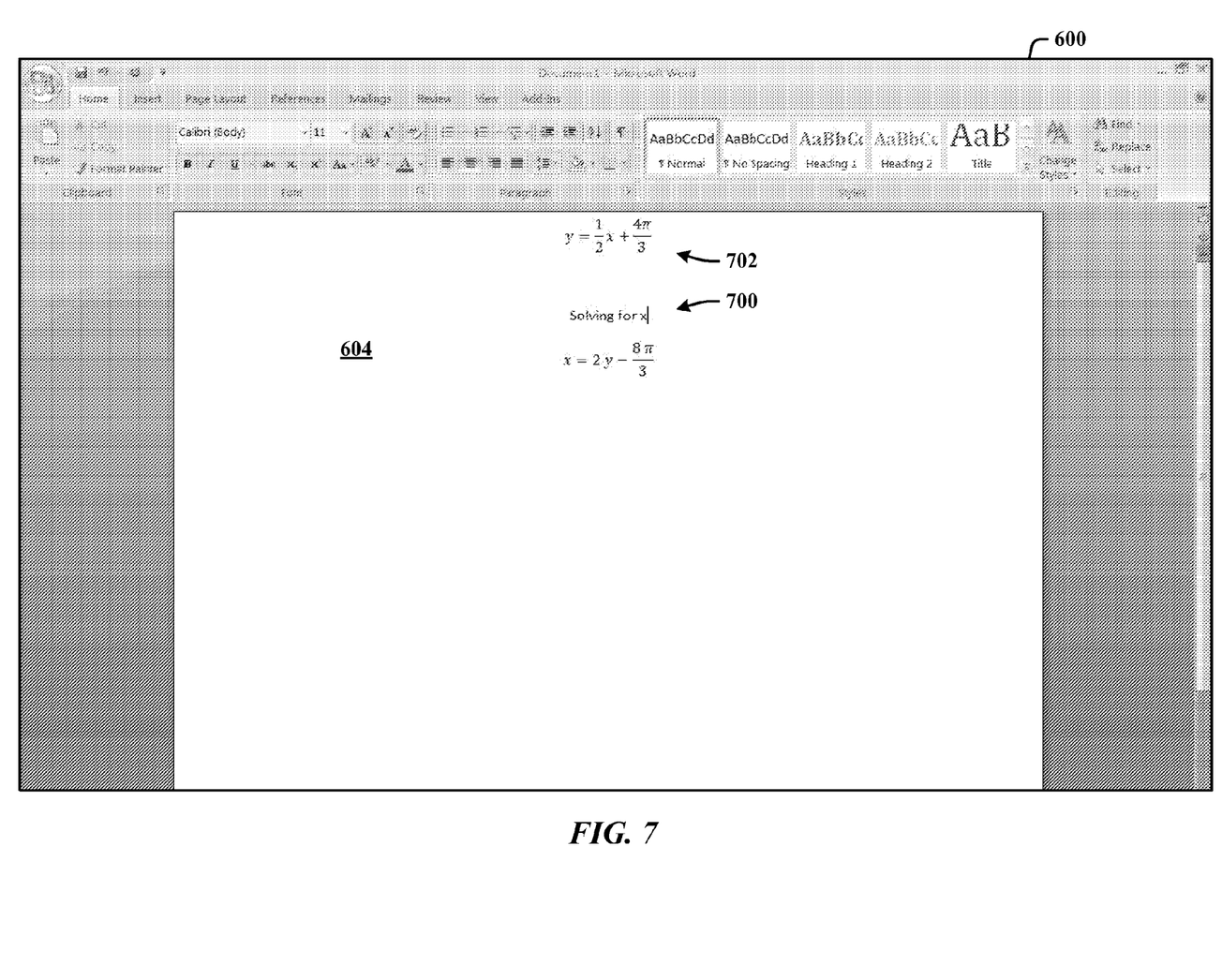
FIG. 7 illustrates a screenshot of the UI in the word processor for receiving a user input in response to a presented equation in the document.

FIG. 7 illustrates a screenshot of the UI 600 in the word processor for receiving a user input 700 in response to a presented equation 702 in the document 604. Here, the user enters text indicating "solving for x" for the presented equation 702, and then enters the equation 700 in terms of x.

Figure 8:
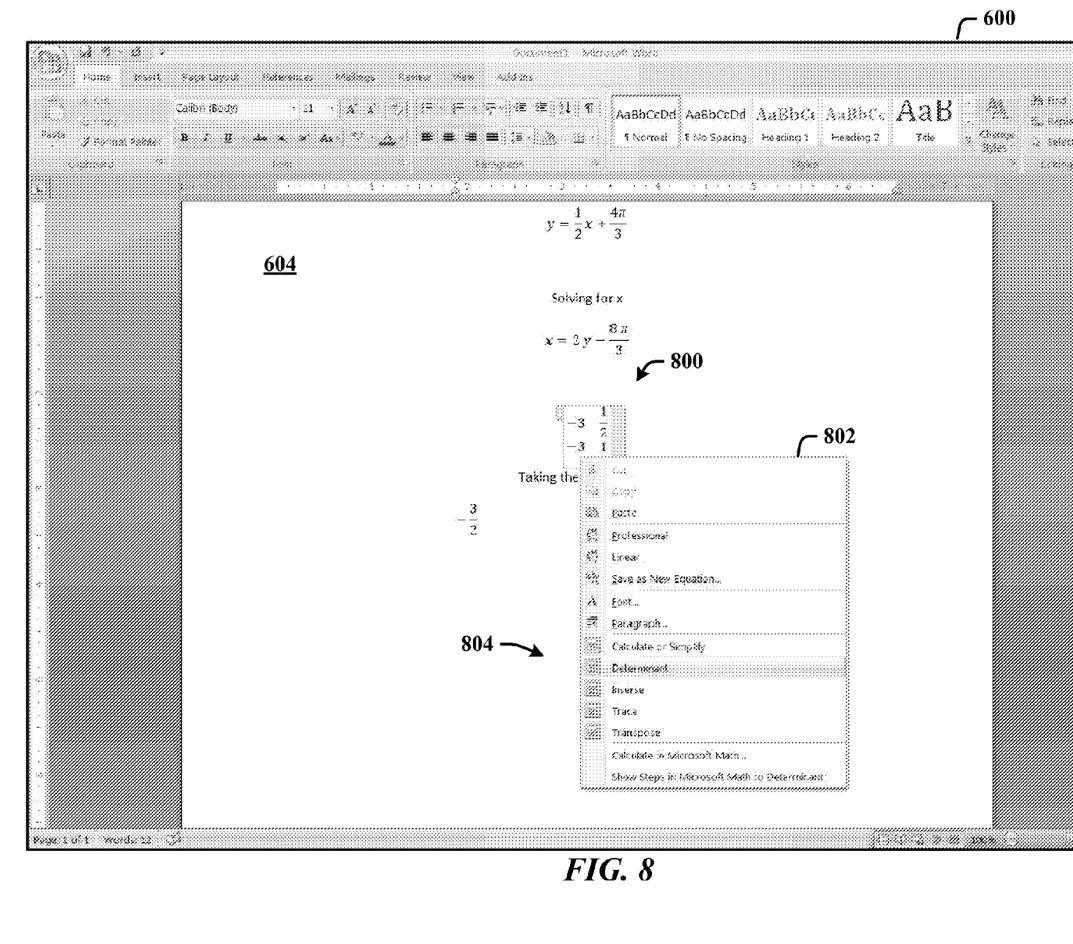
FIG. 8 illustrates a screenshot of the UI in the word processor for receiving and processing additional user input in the document.

FIG. 8 illustrates a screenshot of the UI 600 in the word processor for receiving and processing additional user input 800 in the document 604. In response to transforming the input 800, sending the transformed input to the math engine, and returning possible math operations for the input 800, a floating menu 802 presents the list 804 of operations for user selection.

Figure 9:
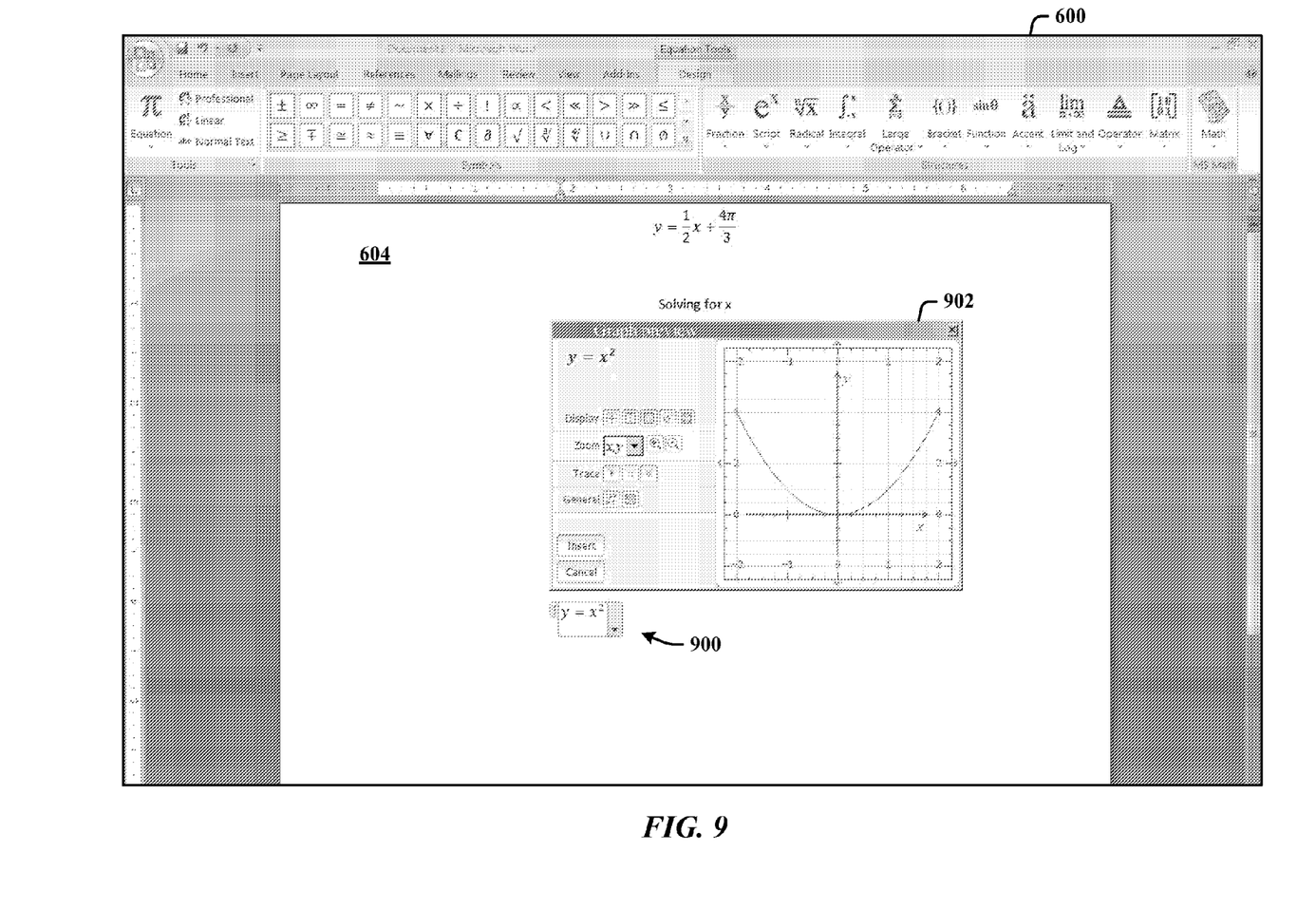
FIG. 9 illustrates a screenshot of the UI in the word processor for receiving a math-based input in the document and generating a graph of the input.

FIG. 9 illustrates a screenshot of the UI 600 in the word processor for receiving a math-based input 900 in the document 604 and generating a graph 902 of the input.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 10:
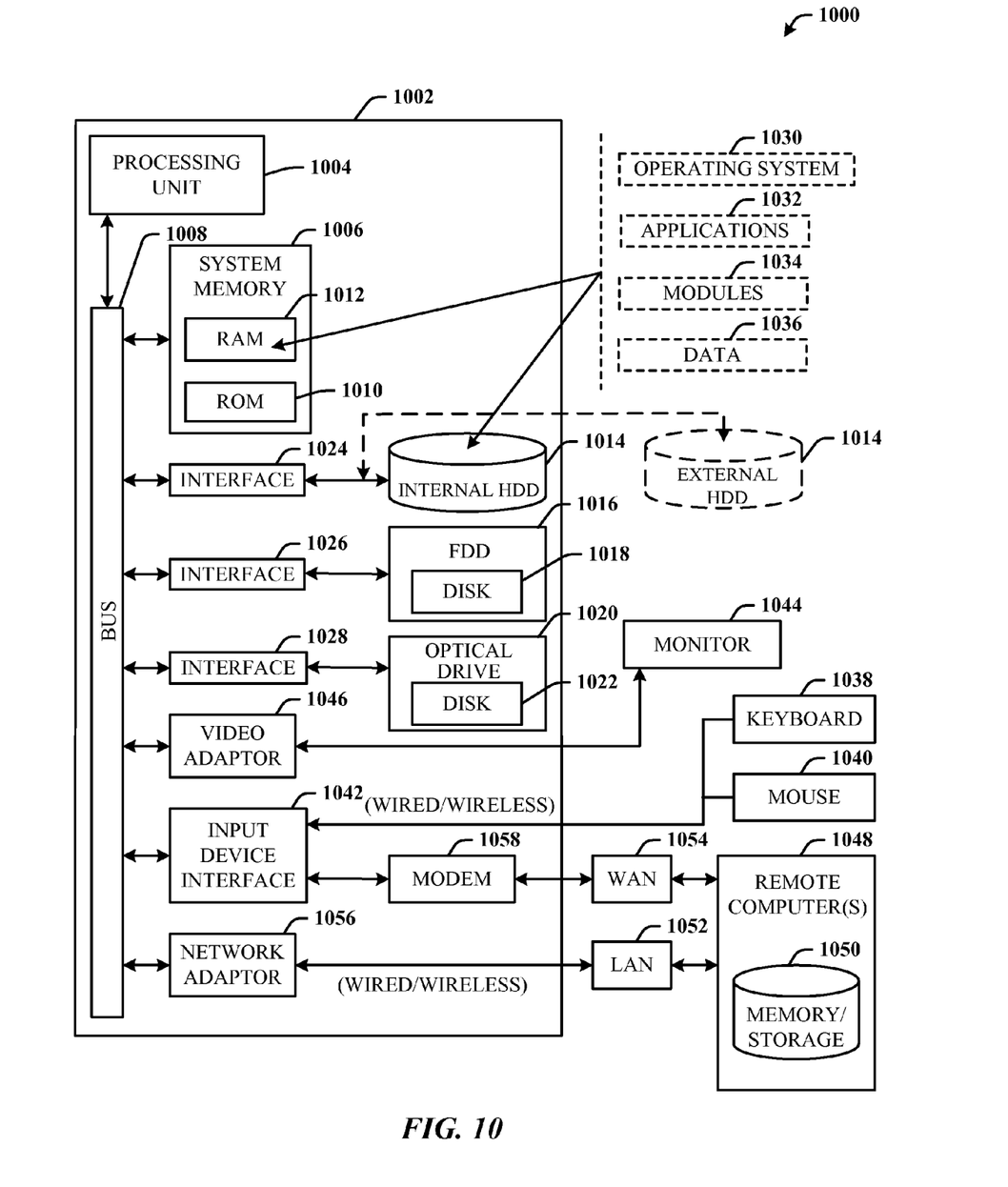
FIG. 10 illustrates a block diagram of a computing system operable to execute math calculation in a word processor in accordance with the disclosed architecture.

Referring now to FIG. 10, there is illustrated a block diagram of a computing system 1000 operable to execute math calculation in a word processor in accordance with the disclosed architecture. In order to provide additional context for various aspects thereof, FIG. 10 and the following discussion are intended to provide a brief, general description of a suitable computing system 1000 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary computing system 1000 for implementing various aspects includes a computer 1002, the computer 1002 including a processing unit 1004, a system memory 1006 and a system bus 1008. The system bus 1008 provides an interface for system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1012, including an operating system 1030, one or more application programs 1032, other program modules 1034 and program data 1036. The one or more application programs 1032, other program modules 1034 and program data 1036 can include the word processing application 102, math input data 104, editing tool 202, document 106, math add-in component 108, transform component 204, math engine 206, UI component 208, graph viewer 210 and grading component 212.

All or portions of the operating system, applications, modules, and/or data can also be cached in the RAM 1012. It is to be appreciated that the disclosed architecture can be implemented with various commercially available operating systems or combinations of operating systems.

A user can enter commands and information into the computer 1002 through one or more wire/wireless input devices, for example, a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wire and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the local network 1052 through a wire and/or wireless communication network interface or adapter 1056. The adaptor 1056 may facilitate wire or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented word processing system, comprising:
    a computer;
    a word processing application of the computer for receiving and rendering math-based input in a word processing document; and
    a math component that interfaces to the word processing application and
    includes a math engine, the math component converts the math-based input into a math markup language for processing by the math engine, the math engine analyzes the math-based input and returns a list of operations from which an operation is selected, the math engine performs the selected operation on the math-based input and inserts a result to the word processing document.

2. The system of claim 1, wherein the math engine performs the math operation selected from at least one of equation solving, calculating, integrating, generating, presenting calculation steps, or a graphing function based on the math operation.

3. The system of claim 1, wherein the math engine analyzes the input in the document and generates a list of possible math operations that can be performed on the input.

4. The system of claim 1, wherein the math component performs the math operation to generate at least one of an interim result or a final result.

5. The system of claim 4, wherein the math component inserts at least one of the interim result or the final result into the document.

6. The system of claim 1, wherein the math-based input includes at least one of a math symbol, math expression, or math equation.

7. The system of claim 1, further comprising a transform component for transforming the math-based input into a format suitable for use by the math component.

8. The system of claim 1, further comprising a graph viewer for presenting a graph of the input via the application.

9. The system of claim 8, further comprising a user interface component for presenting one or more options and operations for manipulating the graph via the document.

10. The system of claim 1, further comprising a grading component for analyzing and grading the result.

11. The system of claim 1, wherein the input is in at least one of a numeric format or a symbolic format.

12. A computer-implemented method of handling math information in a word processor, comprising acts of:
    receiving and rendering math-based content in a word processing document;
        converting the math-based content into converted content having a math markup language format for processing by a math engine;
            analyzing the converted content by the math engine to produce analyzed content;
            selecting a mathematical operation and generating a math result using the math engine based on the analyzed content;
                inserting the math result into the word processing document; and
    utilizing a computer to execute instructions stored in memory to perform at least one of the acts of receiving, converting, analyzing, selecting, or inserting.

13. The method of claim 12, further comprising presenting one or more steps taken to arrive at the result, in the document.

14. The method of claim 12, further comprising generating and presenting a list of selectable operations that can be performed on the content, and checking if a selected operation is a graphing operation.

15. The method of claim 12, further comprising presenting a pop-up dialog via which a customization to a graphing operation is performed.

16. The method of claim 12, further comprising generating and inserting a graph of the content into the document based on a selected operation.

17. The method of claim 12, further comprising sending a selected operation to the math engine for processing of the content based on the operation.

18. The method of claim 12, further comprising making a change to a graph in the document, regenerating the graph based on the change, and reinserting the changed graph into the document.

19. The method of claim 12, further comprising automatically inserting the result into the document when a selected operation is a non-graphing operation.

\* \* \* \* \*